United States Patent
Aggarwal et al.

(10) Patent No.: US 7,844,909 B2
(45) Date of Patent: Nov. 30, 2010

(54) DYNAMICALLY RENDERING A BUTTON IN A HYPERMEDIA CONTENT BROWSER

(75) Inventors: Radhika Aggarwal, Raleigh, NC (US); William H. Krebs, Jr., Cary, NC (US); Elizabeth A. Schreiber, Apex, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1782 days.

(21) Appl. No.: 10/041,183

(22) Filed: Jan. 3, 2002

(65) Prior Publication Data
US 2003/0122870 A1 Jul. 3, 2003

(51) Int. Cl.
G06F 3/00 (2006.01)
G06F 3/048 (2006.01)

(52) U.S. Cl. .................... 715/763; 715/760; 715/765

(58) Field of Classification Search ................ 715/500, 715/501.1, 513, 517, 530, 738, 749, 760, 715/763
See application file for complete search history.

(56) References Cited

U.S. PATENT DOCUMENTS

| | | | | |
|---|---|---|---|---|
| 5,978,817 A * | 11/1999 | Giannandrea et al. | .... | 715/501.1 |
| 5,983,245 A * | 11/1999 | Newman et al. | ............ | 715/513 |
| 5,986,654 A * | 11/1999 | Alexander et al. | .......... | 715/744 |
| 6,058,417 A | 5/2000 | Hess et al. | ................... | 709/219 |
| 6,125,385 A * | 9/2000 | Wies et al. | ................... | 345/163 |
| 6,163,779 A | 12/2000 | Mantha et al. | ............... | 707/100 |
| 6,182,116 B1 | 1/2001 | Namma et al. | ............... | 709/204 |
| 6,795,830 B1 * | 9/2004 | Banerjee et al. | ............. | 707/200 |
| 7,013,340 B1 * | 3/2006 | Burd et al. | ................... | 709/229 |
| 7,109,985 B2 * | 9/2006 | Spencer et al. | .............. | 345/418 |
| 7,114,177 B2 * | 9/2006 | Rosenberg et al. | .......... | 715/738 |
| 2001/0011285 A1 | 8/2001 | Kanno et al. | ................ | 707/512 |

FOREIGN PATENT DOCUMENTS

| | | |
|---|---|---|
| EP | 0851367 | 7/1998 |
| EP | 0984370 | 8/1999 |

OTHER PUBLICATIONS

"Distributing Uniform Resource Locators as Bar Code Images", *IBM Technical Disclosure Bulletin*, vol. 39, No. 01, (Jan. 1996).

(Continued)

*Primary Examiner*—Weilun Lo
*Assistant Examiner*—Truc T Chuong
(74) *Attorney, Agent, or Firm*—Steven M. Greenberg, Esq.; Carey Rodriguez Greenberg & Paul LLP

(57) ABSTRACT

A method of rendering a button in a hypermedia content browser. The method can include decoding a network address received from the content browser to determine encoded characteristics for a button. Once the encoded characteristics for the button have been determined, a button can be dynamically formed based upon the determined characteristics. Once formed, the button can be forwarded to the content browser and the content browser can render the dynamically formed button. The decoding step can include the step of parsing an HTTP request to identify a plurality of parameters which specify display characteristics for the button.

9 Claims, 2 Drawing Sheets

OTHER PUBLICATIONS

Duchamp, D., "Prefetching Hyperlinks", *2nd USENIX Symposium on Internet Technologies and Systems*, pp. 127-138 (1999).

Aoki, Y., et al., "User-Side Web Page Customization", *Human-Computer Interaction: Ergonomics and User Interfaces*, Proceedings of HCI Int'l. 1999 (8th Int'l. Conference on Human-Computer Interaction) Pt. vol. 1, pp. 580-584 (1999).

Webber, J., "The Ethics/Skills Interface in Image Manipulation", *Australian Journal of Information Systems*, vol. 7, No. 2, pp. 89-94, (May 2000).

Goldsborough, et al., "Two Hottest Internet Suites", *PC World*, vol. 13, No. 10, p. 92, (Oct. 1995).

Humpphry, "If It's Spring", *PC Week*, vol. 16, No. 21, p. 18, (May 1996).

Karp, "IE 4.0 Secrets", *Windows Sources*, vol. 5, No. 7, p. 182, (Jul. 1997).

Mace, "Web Graphic Tools", *PC Magazine*, vol. 16, No. 5, p. 141, (Mar. 1997).

Olsen, "Will Success Spoil Web Server?", *Government Computer News*, vol. 14, No. 10, p. 43, (May 1995).

Sempson, "Counseling on the Information Highway: Future . . . ," *Journal of Counseling & Development*, vol. 75, No. 3, pp. 203-212, (Jan. 1997).

Siengh, "Web Explorer", *PC Magazine*, vol. 14, No. 3, pp. 188-189, 194, (Feb. 1995).

Snell, "GoLive Cyberstudio", *MacUser*, vol. 13, No. 5, p. 26, May 1997.

\* cited by examiner

DYNAMICALLY RENDERING A BUTTON IN A HYPERMEDIA CONTENT BROWSER

BACKGROUND OF THE INVENTION

1. Technical Field

The present invention relates to rendering user interface elements in a content browser and more particularly to rendering buttons in a content browser.

2. Description of the Related Art

Prior to the popularization of the Internet and the subsequent deployment of the World Wide Web, software publishers typically distributed computer applications via storage media such as a computer diskette or compact disc. Initially, such computer applications included underlying program logic, data storage and, optionally, a user interface. Over time, as the processing capabilities of underlying computing devices evolved, increasingly more complex user interfaces were developed for use with corresponding computer applications. In particular, the advent of the graphical user interface (GUI) resulted in an expectation among end users that a computer application include an intuitive and aesthetically pleasing graphical interface through which end users could effectively interact with the computer application.

Generally, a GUI associated with an underlying computer application can include one or more GUI widgets, typically a title bar, menu bar, one or more text fields and one or more buttons. With regard to button widgets, each button often can include visual aspects which provide the end user with the illusion that a physical button has been depressed when the user selects the button. Furthermore, aspects of the button such as overlain text can provide the end user with additional information beyond whether the button has been depressed. Finally, the background and foreground coloring of buttons can be helpful in providing end users with additional information regarding the state of the button.

The visual presentation of a button in a conventional GUI can be dynamically altered by providing the GUI with visual display parameters such as color, border style and text. Once the parameters have been provided to the GUI, the button can be "redrawn" as is well-known in the art in order to produce the new button having new visual display characteristics. Importantly, the ability to change the visual presentation of a button dynamically can be particularly helpful in enabling the button for conformance with National Language Support (NLS). In accordance with NLS, the language of text displayed in a button can change as an end user selects different native languages for use in a GUI.

Recently, given the popularization of the Internet and the World Wide Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as Web applications which can include a collection of hypermedia documents such as Web pages which can be viewed in hypermedia content browsers such as Web browsers.

In the case of a Web application, the user interacts with the underlying program logic not through a traditional GUI, but through a GUI provided by widgets embedded in a hypermedia document displayed in a hypermedia content browser. Unfortunately, Web-based GUIs do not enjoy the same flexibility of the conventional GUI. Specifically, GUI widgets which can be dynamically modified during run-time are not also included as part of a Web-enabled GUI. In fact, fundamental limitations of modern markup languages prohibit software developers from accessing "basic" GUI components such as a feature rich button.

As an example, presently, to change the NLS attributes of a Web-based GUI, static images of buttons having localized text which have been pre-generated "by hand" must be employed. Unlike conventional GUI buttons whose visual display characteristics can be changed only by modifying a parameter list, in a Web-based GUI, a static image of a button must be pre-generated for each possible button state. Hence, buttons in a Web-based GUI cannot provide the same advantages as the feature rich buttons of a conventional GUI.

SUMMARY OF THE INVENTION

The present invention relates to the dynamic creation and rendering of a button in a hypermedia content browser such as a Web browser. In particular, button rendering parameters such as color, text and position information can be encoded in a network address such as a uniform resource locator (URL). The network address, in turn, can be included as part of a markup tag which can be embedded in a hypermedia document such as a Web page. Upon activation of the network address, the button rendering parameters can be forwarded to a server at the network address. The server can pass the button rendering parameters to an image generator in which the button rendering parameters can be processed to dynamically form an image of a button. Finally, the dynamically formed image of the button can be returned to the hypermedia content browser which can render the image of the button in a display.

The use of the present invention can overcome the deficiencies of the prior art by eliminating both the need to create static images of a button "by hand" using a separate graphics program, and also the need to incorporate the hand-created images in a hypermedia document. Rather, in accordance with the inventive arrangements, only the characteristics of the button and a network address for the server need be included in the hypermedia document in order to suitably render the button. Once included, the activation of the network address can cause the dynamic rendering of the button. The dynamic rendering of the button in the hypermedia document browser, in turn, can give users a user interface experience similar to that of conventional computer programs.

The invention can include a method of rendering a button in a hypermedia content browser. In the method of the invention, parameters which specify display characteristics for a button can be encoded in a network address. Subsequently, the network address can be embedded in a markup tag in a hypermedia document which can be accessed through the hypermedia content browser. The markup tag, when activated, can cause the browser to forward the encoded display characteristics to a server at the network address. Notably, the server can be configured to process the display characteristics. Once display characteristics have been received, the server can dynamically generate an image of a button which has display characteristics which are consonant with the received display characteristics. The server can return the dynamically generated image of the button which can be rendered in the hypermedia content browser.

In one aspect of the present invention, the encoding step can include formatting a hypertext transfer protocol (HTTP) request with a plurality of parameters which specify display characteristics for the button. In that case, the embedding step can include the step of inserting the network address in an hypermedia document which has been formatted using markup tags which conform to the hypertext markup language (HTML). Finally, the rendering step can include the steps of: reloading the hypermedia document in the content browser; locating a position in a display in the content browser which corresponds to the image of the button; and, displaying the image of the button in the content browser at the located position in lieu of any images of a button which had previously been displayed at the located position.

In a second aspect of the invention, a method of rendering a button in a hypermedia content browser can include decoding a network address received from the content browser to determine encoded characteristics for a button. Once the encoded characteristics for the button have been determined, a button can be dynamically formed based upon the determined characteristics. Once formed, the button can be forwarded to the content browser and the content browser can render the dynamically formed button. In the second aspect of the invention, the decoding step can include the step of parsing an HTTP request to identify a plurality of parameters which specify display characteristics for the button.

The present invention also can include a system for rendering a button in a hypermedia content browser. The system can include a hypermedia document for display in the hypermedia content browser. The hypermedia document can include at least one embedded markup tag which can include a network address. Importantly, the network address can include therein encoded display characteristics for a button.

The system further can include a servlet which can be accessed through the hypermedia document over a computer communications network. The servlet can be configured to decode the network address to determine the encoded display characteristics. Finally, the system can include a dynamic button creation engine communicatively linked to the servlet over the computer communications network. The engine can be configured to dynamically create button images based upon decoded display characteristics provided by the servlet.

In one aspect of the system of the invention, the hypermedia content browser can be a Web browser and the hypermedia document can be a Web page. Furthermore, the network address can be a Uniform Resource Locator (URL). Notably, the display characteristics can include at least one of text, foreground and background color, font, border style and image location. Finally, the dynamically created button images can be formatted in the Graphics Interchange Format (GIF).

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for dynamically creating and rendering a button in a hypermedia content browser such as a Web browser. In accordance with the inventive arrangements, button rendering parameters such as color, text and position information can be encoded in a network address such as a URL. The network address, in turn, can be embedded in a markup tag in a hypermedia document such as a Web page. Upon activation of the network address, the button rendering parameters can be forwarded to a server accessible at the network address. The server can pass the button rendering parameters to an image generator in which the button rendering parameters can be processed to dynamically form an image of a button. Finally, the dynamically formed image of the button can be returned to the hypermedia content browser which can render the image of the button in a display.

Figure 1:
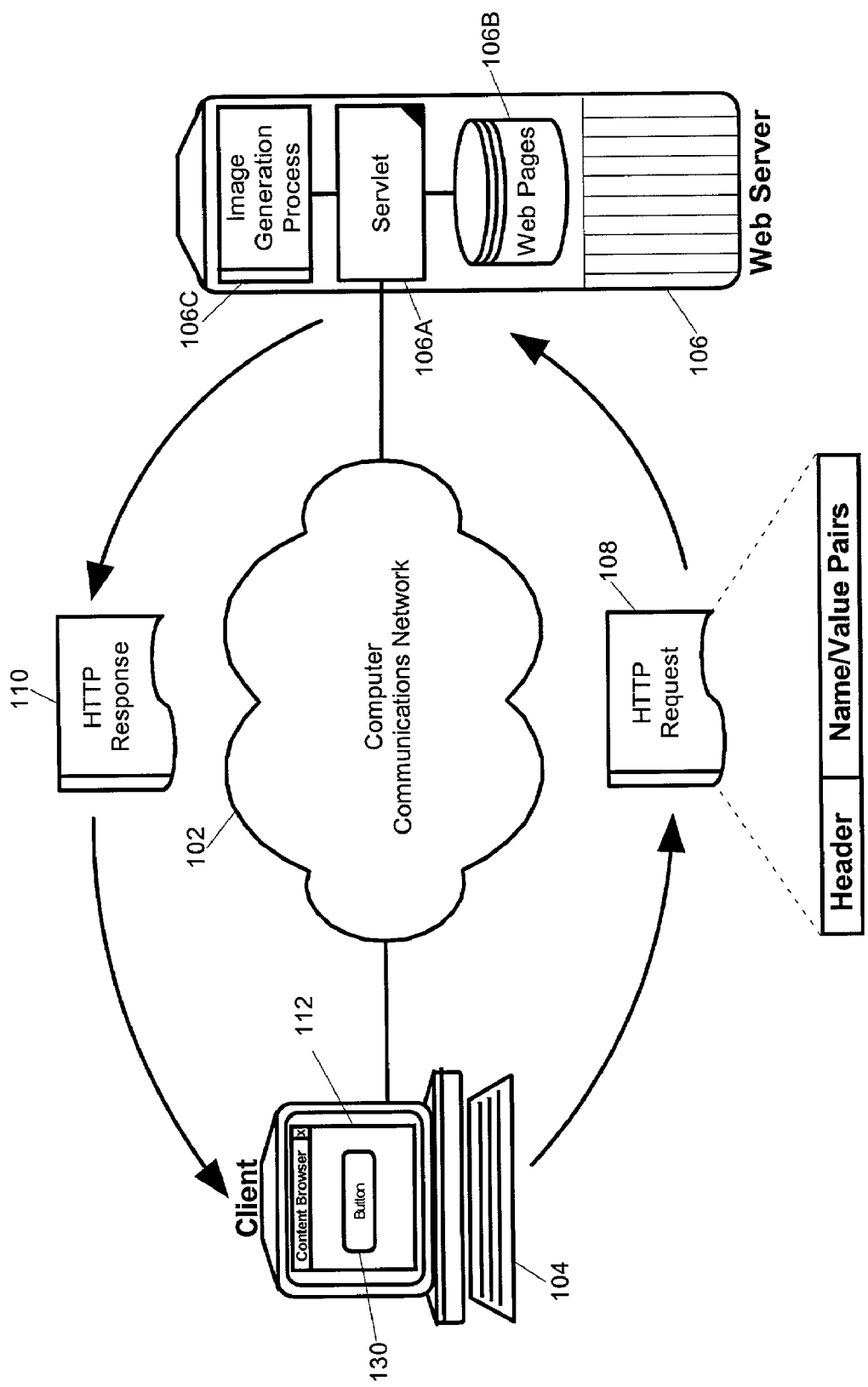
FIG. 1 is a schematic illustration of a system which has been configured to dynamically render a button in a content browser in accordance with the inventive arrangements; and, FIG. 2 is a flow chart depicting a process for dynamically rendering a button in a content browser in accordance with the inventive arrangements.

FIG. 1 is a schematic illustration of a system which has been particularly configured to dynamically create and render a button in a Web browser. Specifically, the system can include a Web server 106 and a client computer 104, communicatively linked via a computer communications network 102, for example the Internet. A content browser 112 such as a Web browser can operate within the client computer 104. As is well known in the art, the content browser 112 can load and display hypermedia content, for instance Web pages, XML documents, graphics images and audio-visual content. Additionally, where configured with suitable add-in logic, the content browser can audibly present audio material such as pre-recorded and live speech and music. The Web server 106, by comparison, can store therein hypermedia content such as Web pages 106B which can be "served" to requesting clients such as client 104.

Importantly, hypermedia documents which can be displayed in the content browser 112 can include activatable hyperlinks to additional content disposed in servers about the computer communications network 102. Specifically, as will be recognized by one skilled in the art, hyperlinks can include a reference to a network server and one or more operational parameters which can be used to instruct the server either to perform additional processing or to return particular data. For instance, a hyperlink in the hypermedia document, when activated, can transmit a request to a specified server to return additional hypermedia content. Alternatively, the hyperlink, when activated, can transmit a request to return a particular image which can be displayed in the content browser.

In the context of the Web browser 112 of FIG. 1, a Hypertext Markup Language (HTML) compliant document provided, for instance, by the Web server 106, can be displayed in the Web browser 112. In particular, in accordance with version 3.2 of the HTML specification, a FORM can be specified in the hypermedia document in which INPUT fields are provided. As is known in the art, an HTML FORM is analogous to a conventional paper form in which certain data fields are pre-specified and presented to an end-user. The end-user can "fill out" the form by providing data which corresponds to particular ones of the pre-specified fields. In version 3.2 of the HTML specification, end-users can electronically "fill out" a form and submit the form to a back-end server such as the Web server 106 of FIG. 1. In one aspect of the present invention, the data provided by the end-user can be provided to the Web server 106 via one of the HTML specified GET or POST operations.

More specifically, once the end-user has decided to "submit" the form, the contents of the form can be concatenated into name/value pairs each including a pre-specified field and corresponding user-provided value. The name-value pairs can be encapsulated in an HTTP request 108 and forwarded via the GET or POST operation to the Web server 106 for further processing. Ordinarily, HTML FORMs provide for further processing through a Common Gateway Interface (CGI) in a Web server. In the present invention, the system is not so limited. Rather, in the present invention, the HTTP request 108 can be further processed by other forms of server-side processing logic such as servlet 106A.

In any case, once the HTTP request 108 has been forwarded to the Web server 106, a servlet 106A in the Web server 106 can receive the HTTP request 108 and can parse the name/value pairs of the HTTP request 108. Once the servlet 106A has processed the HTTP request 108, response data can be formulated and encapsulated in an HTTP response 110. Subsequently, the HTTP response 110 can be transmitted over the computer communications network 102 to the requesting client 104.

Furthermore, where the HTTP response 110 is another Web page, the Web page can be rendered in the content browser 112.

In accordance with the inventive arrangements, a feature rich image button 130 can be dynamically rendered in the content browser 112 by performing the following method. Initially, the HTML markup tag, "<INPUT type=IMAGE>, can be used to emulate the well-known <INPUT type=BUTTON> tag. Notably, in version 3.2 of the HTML specification, the FORM-related INPUT tag defines a form element that can receive user input. The INPUT tag can be used in conjunction with a TYPE attribute. The TYPE attribute can determine the specific sort of form element to be created. TYPE can be one of the following: BUTTON, CHECKBOX, FILE, HIDDEN, IMAGE, PASSWORD, RADIO, RESET, SUBMIT, and TEXT.

In the present invention, the IMAGE attribute, when used in conjunction with the INPUT tag, can cause the content browser to place an image, serving as a custom button, on an HTML form. When a user selects the image element, the form is submitted to the server. More specifically, IMAGE is a TYPE attribute value to the INPUT element for a FORM. It specifies an image that can be clicked upon to pass information to the processing script. The following represents an acceptable syntax for the INPUT TYPE=IMAGE instruction:

```
<INPUT TYPE="IMAGE"
    ALIGN="LEFT"|"RIGHT"|"TOP"|"ABSMIDDLE"
        |"ABSBOTTOM"|"TEXTTOP"|"MIDDLE"
        |"BASELINE"|"BOTTOM"
    NAME="name"
    SRC="location">
```

In the above syntax, ALIGN specifies the alignment of the image in relation to the surrounding text. The possible values are LEFT, RIGHT, TOP, ABSMIDDLE, ABSBOTTOM, TEXTTOP, MIDDLE, BASELINE, and BOTTOM. NAME=name specifies the name of the input element. This value is used as the name portion of the name/value pair for this element that is sent to the server when the form is submitted. The name is not displayed on the form. Finally, SRC="location" specifies the network address of the image to be displayed in the document. An example of the use of the INPUT TYPE=IMAGE operation follows:

```
<FORM>
    <INPUT TYPE="image"
    SRC="http://my.graphics.com/graphic.gif"
    NAME="imgsub" ALIGN="top"
    WIDTH="50"HEIGHT="50">
</FORM>
```

In the present invention, the <INPUT type=IMAGE> tag permits the use of any arbitrary image as a submittable HTML element. Importantly, as will be apparent to one skilled in the art, images specified by the markup tag, <INPUT type=IMAGE>, can contain text, colors and styles typically not provided by other submittable HTML elements. In fact, the submittable HTML element, BUTTON, as defined by version 3.2 of the HTML specification, cannot accommodate such a wide variety of display parameters without also requiring additional client-side processing often provided by executable scripts and the like.

Significantly, according to the present invention, in addition to selecting and encoding an image in the markup tag, <INPUT type=IMAGE src=LOCATION>, display parameters such as text, font, color, border style and alignment also can be included in the network address specified by the LOCATION attribute. In particular, in the present invention, where the LOCATION attribute is a URL, the display parameters can be concatenated with the URL. As a result, when the image is selected, the display parameters along with the network address can be encapsulated in an HTTP request 108 and forwarded to a server specified by the network address in the LOCATION attribute. As shown in FIG. 1, the server which can be accessed at that network address can be the Web server 106.

Once the HTTP request has been received by the Web server 106, particularly in the servlet 106A, the servlet 106A can decode the URL which has been encapsulated in the HTTP request 108. In particular, the servlet 106A can extract from the URL all of the display parameters for the button 130. Responsive to extracting the display parameters, the servlet 106A can forward the extracted display parameters to an image generation process 106C associated with the server 106. Importantly, though FIG. 1 depicts the image generation process 106C as being part of the server 106, the invention is not so limited in this regard. Rather, the image generation process 106C can be performed externally or internally to the server 106.

The image generation process 106C can dynamically generate a modified button image based upon the received parameters. In particular, where the button 130 is NLS-enabled, the image generation process 106C can select suitable NLS-enabled text, a button border style, foreground and background colors, and alignment attributes. The image generation process 106C further can combine the display characteristics to produce the dynamically generated button 130. Subsequently, the button 130 can be encoded, for example using the graphics interchange format (GIF), and returned to the servlet 106A. The servlet 106A, in turn, can encapsulate the dynamically produced button in an HTTP response 110 which can be forwarded by the Web server 106 to the client 104. Finally, the button 130 can be rendered by the content browser 112.

Figure 2:
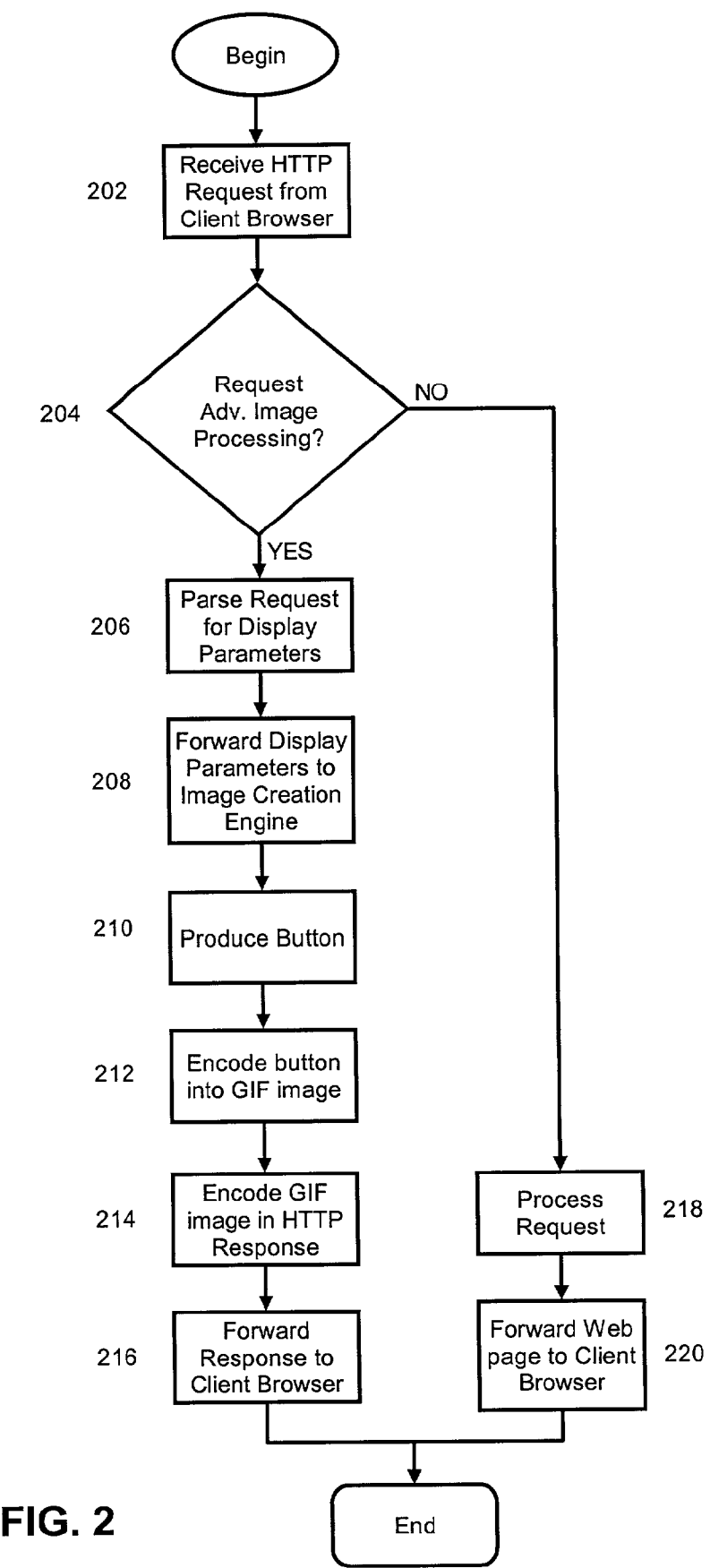

FIG. 2 is a flow chart which illustrates a process for dynamically generating a button in a hypermedia content browser such as a Web browser. The process can begin in block 202 in which an HTTP request can be received from a client browser. The HTTP request can be decoded to identify therein a request for advanced image processing. In decision block 204, if a request for advanced image processing is not detected in the HTTP request, in block 218 the HTTP request can be processed conventionally. In many cases, a conventional HTTP request can result in the production of a Web page to be forwarded to the content browser. Hence, in block 220, the produced Web page can be forwarded to the client browser before the process terminates.

By comparison, if in decision block 204, a request for advanced image processing is detected in the HTTP request, in block 206, a URL can be extracted from the HTTP request and the URL can be parsed to identify the display parameters for the button. In block 208, the display parameters can be forwarded to an image creation engine in the Web server. The image creation engine, in block 210, can dynamically produce a button image with has display properties which are consonant with the display parameters. Subsequently, in block 212 the image creation engine can encode the button image into a graphics format such as GIF. Finally, in blocks 214 and 216, the GIF encoded button image can be encapsulated in an HTTP response and forwarded to the client browser in which the dynamically generated button can be rendered.

Importantly, the need to have images on Web page that "act like" or are "presented as" buttons is a common requirement. Current solutions to this problem involve creating images "by-hand" using a separate graphics program followed by the use of these static images in a Web page. The present invention incorporates important information about how a button image should appear and embeds this information into an image URL in a Web page. The embedded information then can be used by a servlet to create button images dynamically. Hence, the dynamic model of the present invention facilitates the incorporation of NLS-enabled text, fonts, colors and styles into Web-based button images without having to painstakingly create these images by hand.

The present invention can be realized in hardware, software, or a combination of hardware and software. A method and apparatus for rendering a button in a hypermedia content browser according to the present invention can be realized in a centralized fashion in one computer system, or in a distributed fashion where different elements are spread across several interconnected computer systems. Any kind of computer system, or other apparatus adapted for carrying out the methods described herein, is suited.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of rendering a button in a hypermedia content browser, comprising the steps of:
   encoding in a network address parameters which specify display parameters which define display characteristics for an icon;
   embedding, by the content browser, said network address in a markup tag in a hypermedia document which can be accessed through the hypermedia content browser, said markup tag, when activated, causing said browser to forward said encoded display parameters to a server at said network address which has been configured to process said display parameters; and
   receiving from said server a dynamically generated image of an icon which has display characteristics which are consonant with said defined display characteristics;
   rendering said dynamically generated image of said icon in the hypermedia content browser; and
   wherein said encoding step comprises the step of formatting a hypertext transfer protocol (HTTP) request with said plurality of parameters which specify display characteristics for said button.

2. The method of claim 1, wherein said embedding step comprises the step of inserting said network address in a hypermedia document which has been formatted using markup tags which conform to the hypertext markup language (HTML).

3. The method of claim 1, wherein said rendering step comprises the steps of:
   reloading said hypermedia document in the content browser;
   locating a position in a display in the content browser which corresponds to said image of said icon; and,
   displaying said image of said icon in the content browser at said located position in lieu of any images of an icon which had previously been displayed at said located position.

4. A hardware system for rendering an icon in a hypermedia content browser, comprising:
   a hypermedia document for display in the hypermedia content browser, said hypermedia document comprising at least one embedded markup tag, said markup tag comprising a network address, said network address comprising encoded display parameters defining display characteristics for an icon;
   a servlet which can be accessed through said hypermedia document over a computer communications network, said servlet being configured to decode said network address to determine said defined display characteristics; and,
   a dynamic icon creation engine communicatively linked to said servlet over said computer communications network, said engine being configured to dynamically create icons based upon defined display characteristics in encoded display parameters provided by a servlet button,
   wherein the network address is embedded, by the content browser, in said markup tag in said hypermedia document; and
   wherein said encoded display parameters comprise a step of formatting a hypertext transfer protocol (HTTP) request with said plurality of parameters which specify display characteristics for said button.

5. The system of claim 4, wherein the hypermedia content browser is a Web browser and said hypermedia document is a Web page.

6. The system of claim 4, wherein said network address is a Uniform Resource Locator (URL).

7. The system of claim 4, wherein said display characteristics comprise at least one of text, foreground and background color, font, border style and image location.

8. The system of claim 4, wherein said dynamically created icons are formatted in the Graphics Interchange Format (GIF).

9. The system of claim 4, wherein said icons are buttons.

* * * * *